Sept. 17, 1963 N. P. POPICH 3,103,790
SUBMERGED TRENCHING MACHINE
Filed Dec. 17, 1959 6 Sheets-Sheet 1
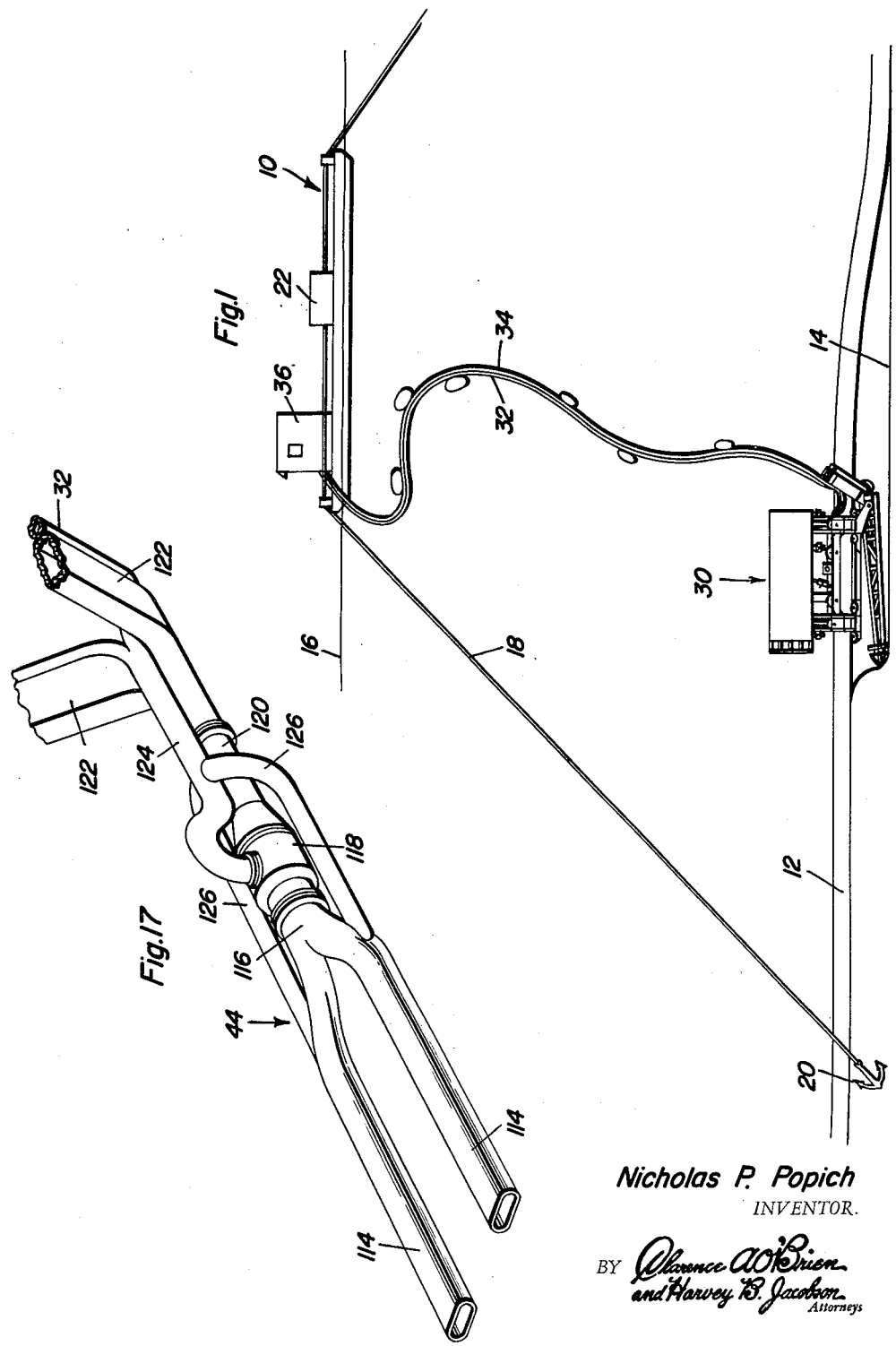
Nicholas P. Popich
INVENTOR.

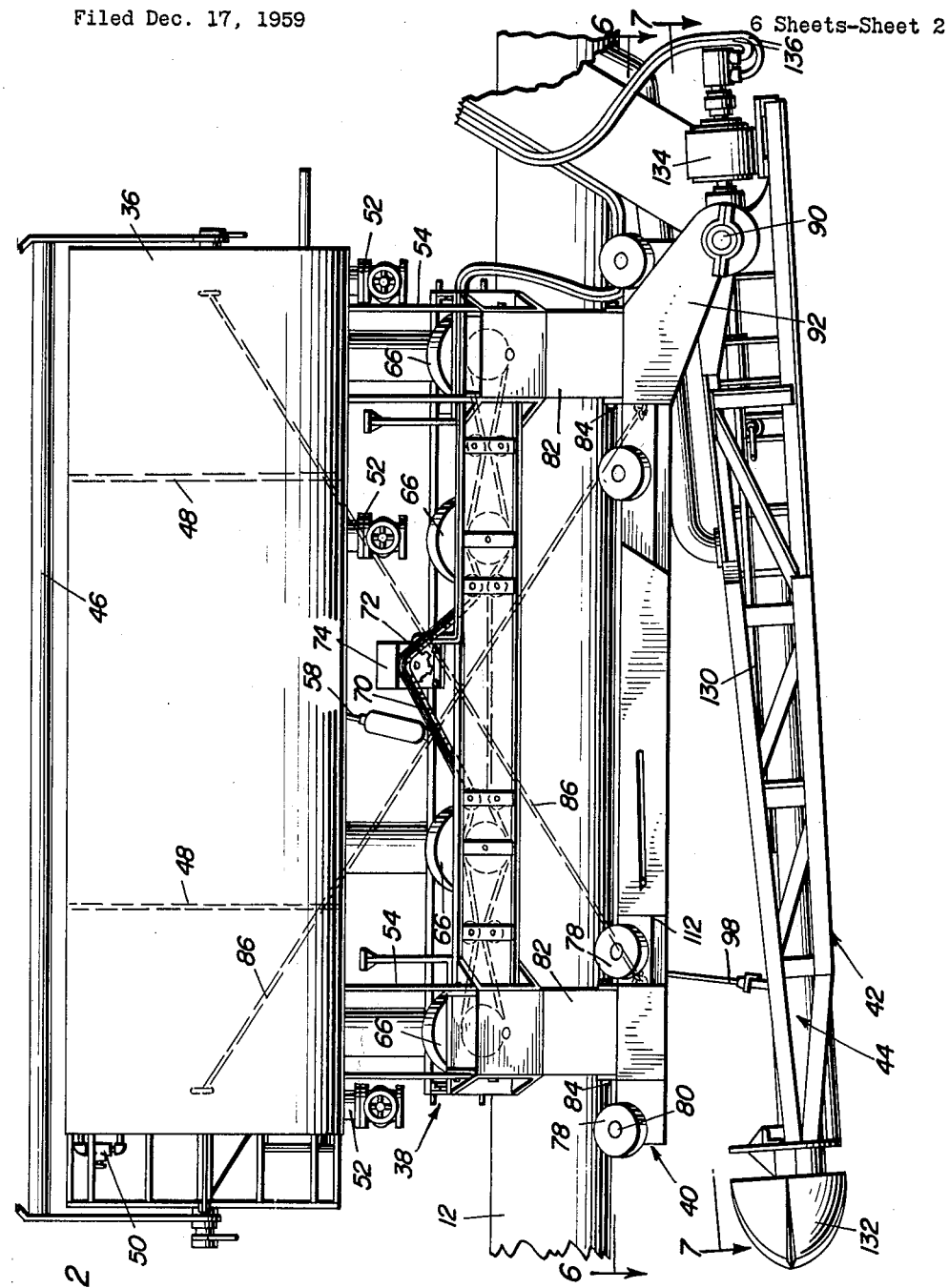

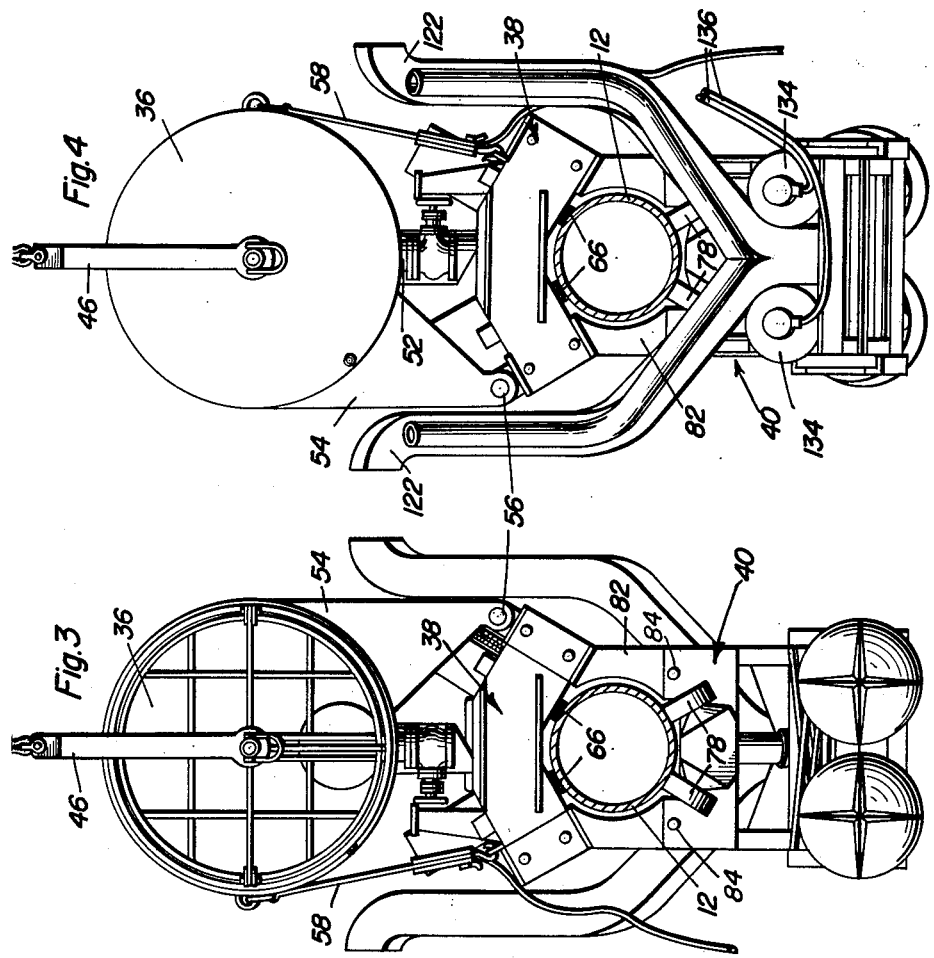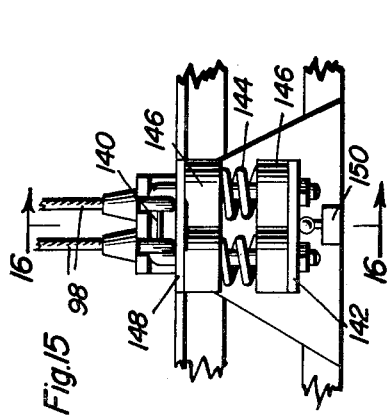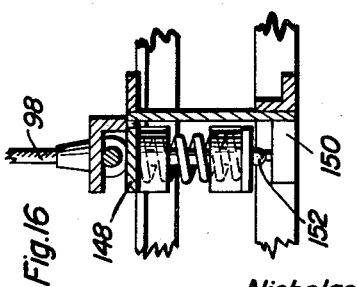

Sept. 17, 1963 N. P. POPICH 3,103,790
SUBMERGED TRENCHING MACHINE
Filed Dec. 17, 1959 6 Sheets-Sheet 4
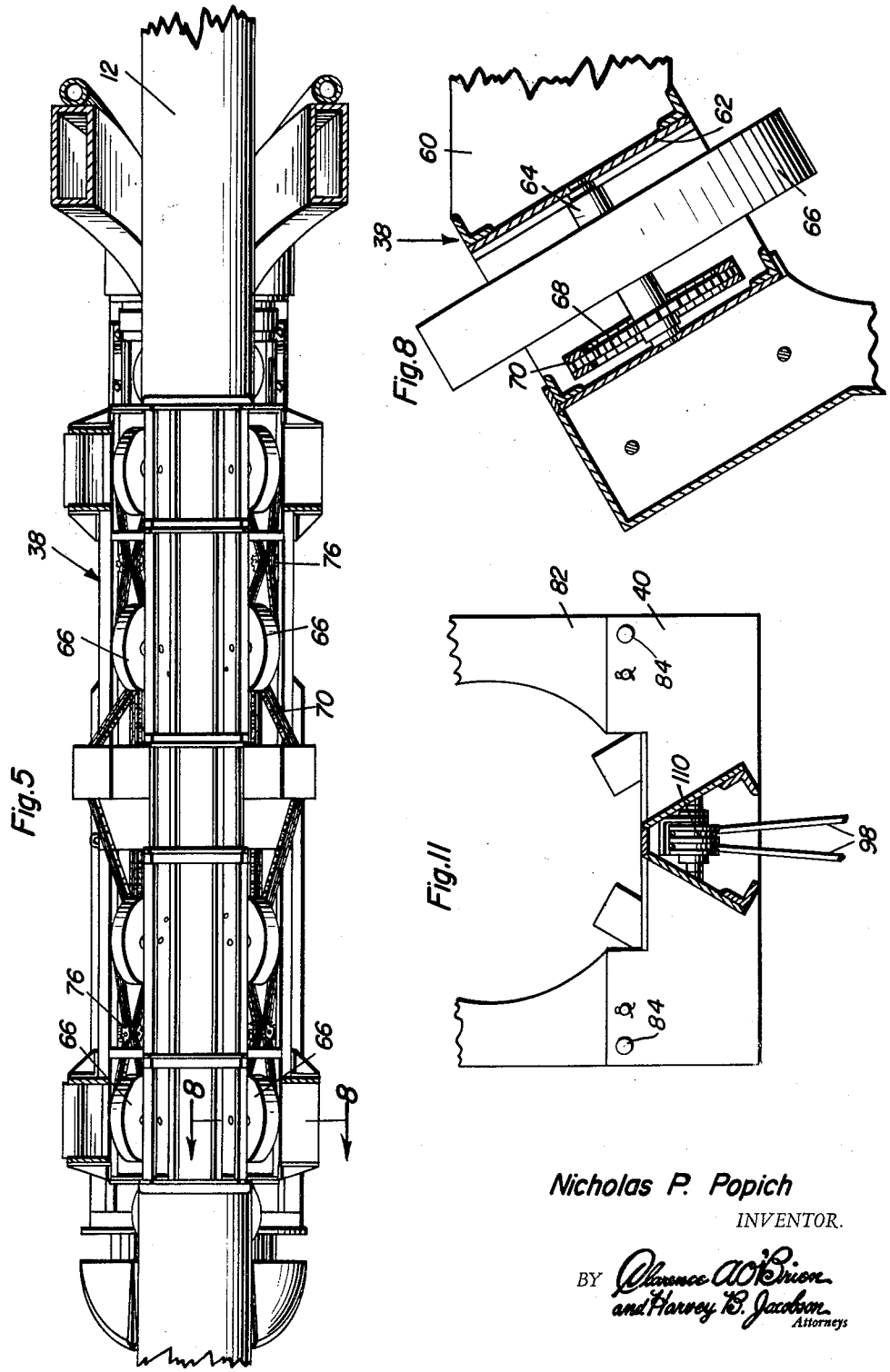
Nicholas P. Popich
INVENTOR.

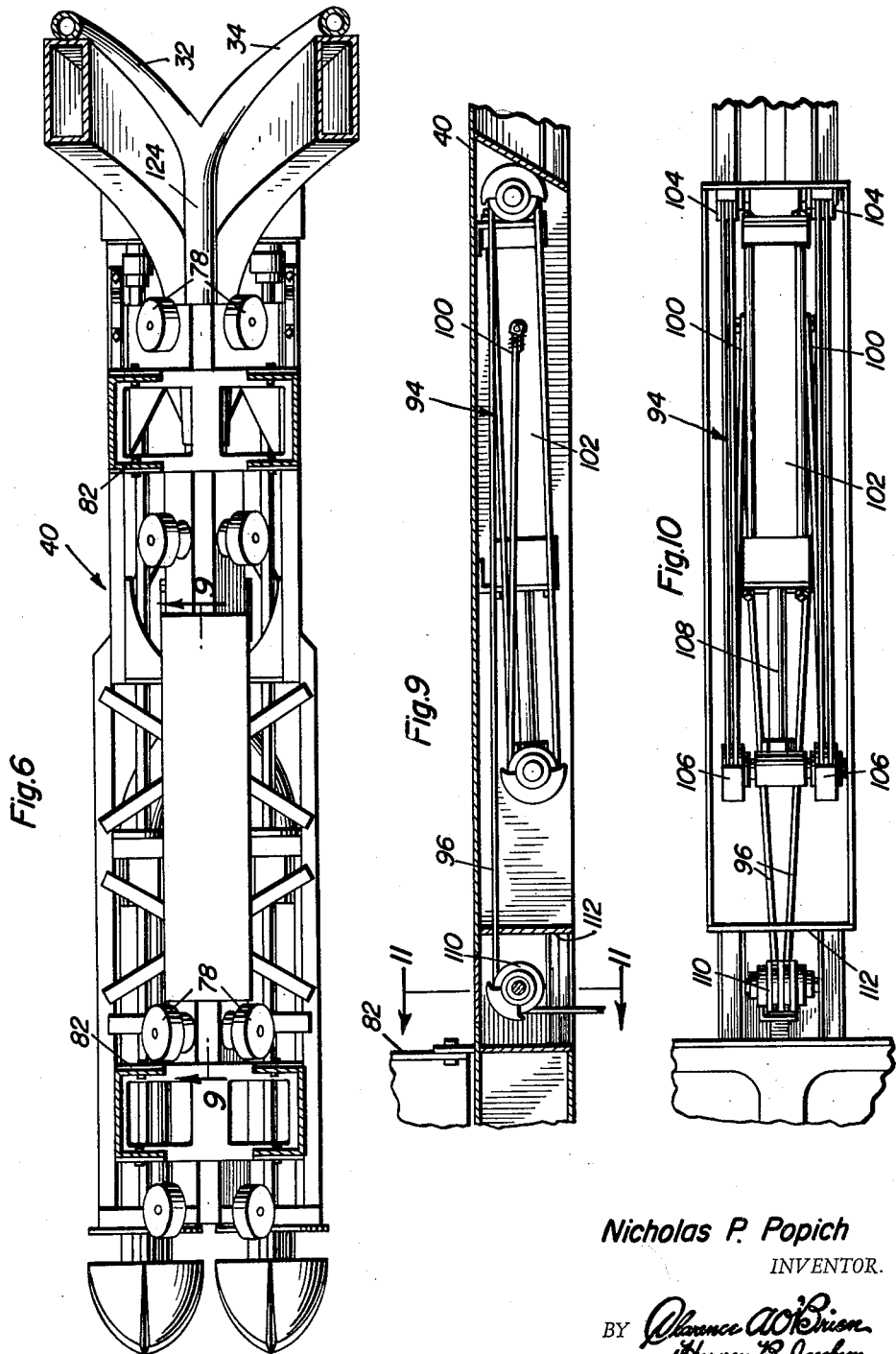

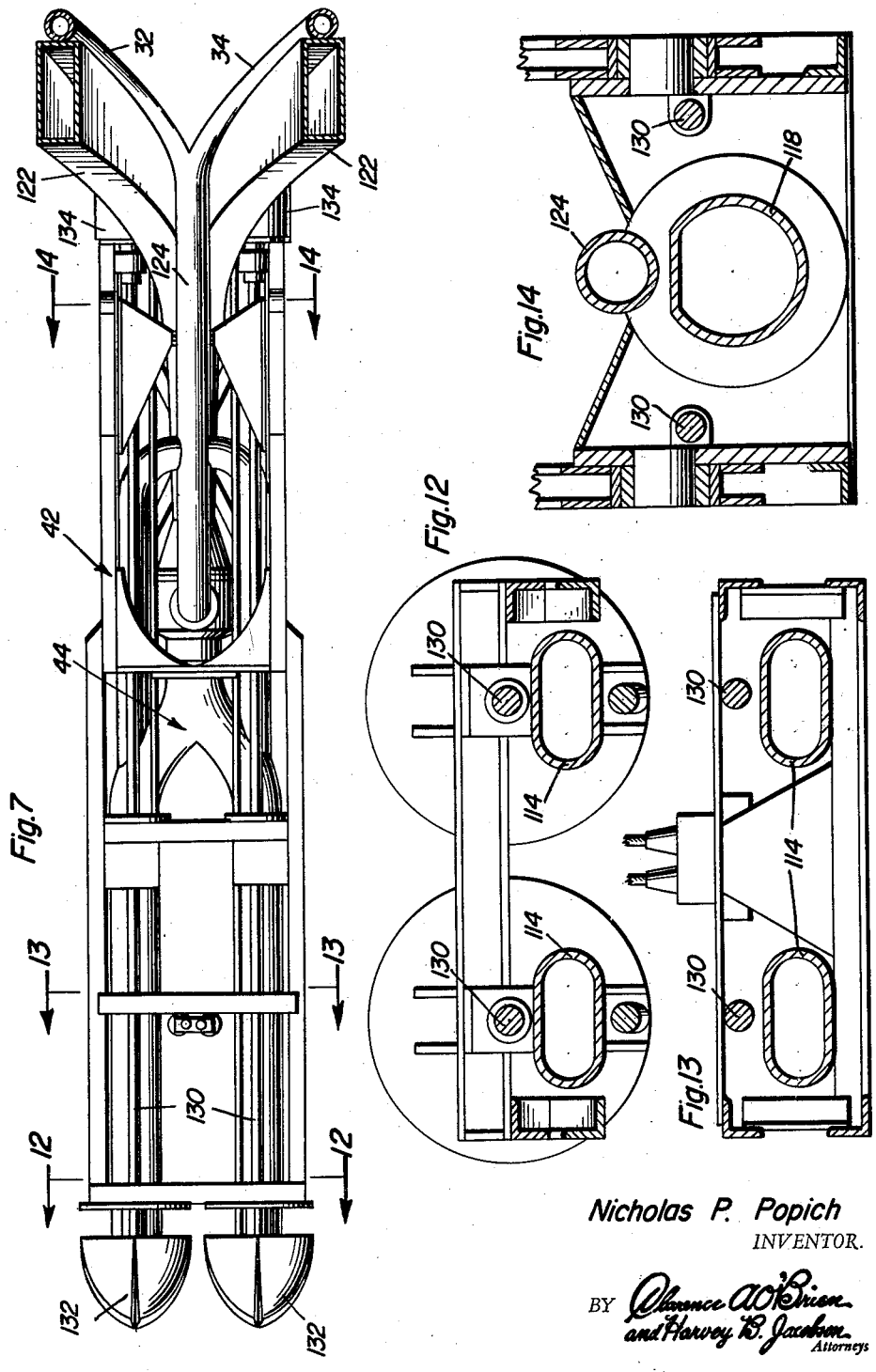

United States Patent Office 3,103,790
Patented Sept. 17, 1963

3,103,790
SUBMERGED TRENCHING MACHINE
Nicholas P. Popich, New Orleans, La., assignor to Submarine Trenching, Inc., a corporation of Texas
Filed Dec. 17, 1959, Ser. No. 860,134
5 Claims. (Cl. 61—72.4)

This invention comprises a novel and useful submerged trenching machine and more particularly relates to an apparatus to effect in an improved manner the laying of pipe lines and conduits in submarine trenches.

The principal object of this invention is to provide an apparatus which will greatly facilitate and enable a more precise control to be effected in the depositing of conduits or pipe lines in submarine trenches.

A further object of the invention is to provide an apparatus which shall cooperate with a pipe line or conduit in an improved manner to facilitate the depositing and burying of the same in a submarine trench and which may be effectively controlled and operated from a barge or the like upon the surface of a body of water.

A further important object of the invention is to provide an apparatus in accordance with the preceding objects which shall be mounted upon and travel upon a conduit or pipe while performing the operation of excavating a submarine trench and depositing the pipe therein.

A further and more specific object of the invention is to provide an apparatus in conformity with the preceding objects which shall effect the excavating of a submarine trench by a suction dredge assembly operated from the surface which dredge assembly shall be movably mounted upon and carried by a pipe line or conduit to be deposited in a submarine trench.

These together with other objects and advantages which will become subsequently apparent reside in the details of construction and operations more fully hereinafter described and claimed, reference being had to the accompanying drawings forming a part thereof, wherein like numerals refer to like parts throughout, and in which:

FIGURE 1 is a somewhat diagrammatic view in elevation showing a preferred form of apparatus in accordance with this invention and the manner of operating the apparatus to effect the formation of a submarine trench and the laying of a pipe line therein;

FIGURE 2 is an elevational view of the novel trenching machine of FIGURE 1 mounted upon a pipe line for laying the latter in a submarine trench;

FIGURE 3 is a front elevational view of the apparatus as shown in FIGURE 2;

FIGURE 4 is a rear elevational view of the apparatus as shown in FIGURE 2;

FIGURE 5 is a horizontal sectional view, parts being broken away and showing in top plan the upper carriage assembly of the apparatus when the latter is mounted upon a conduit or pipe to be entrenched by the machine;

FIGURE 6 is a horizontal sectional view taken substantially upon the plane indicated by the section line 6—6 of FIGURE 2 and showing the lower carriage assembly of the apparatus;

FIGURE 7 is a horizontal sectional view taken substantially upon the plane indicated by the section line 7—7 of FIGURE 2 and showing the ladder assembly of the apparatus which carries and supports the suction dredge portion of the apparatus for excavating a submarine trench in accordance with the invention;

FIGURE 8 is a detail view in vertical transverse section, taken substantially upon an enlarged scale upon the plane indicated by the section line 8—8 of FIGURE 5, and showing the structure of one of the support and driving rollers of the upper carriage assembly by which the device is mounted upon and moves along a pipe line during the operation of the apparatus;

FIGURE 9 is a detail view in vertical longitudinal section, being taken upon an enlarged scale substantially upon the plane indicated by the section line 9—9 of FIGURE 6, and illustrating the cable and pulley assembly for adjustably raising and lowering the ladder assembly and the suction dredge carried thereby;

FIGURE 10 is a detail view in top top plan of the arrangement of FIGURE 7;

FIGURE 11 is a detail view in vertical transverse section, being taken upon an enlarged scale substantially upon the plane indicated by the section line 11—11 of FIGURE 9 and showing further structural detail of the cable and pulley assembly;

FIGURE 12 is a vertical transverse sectional detail view taken upon an enlarged scale and substantially upon the plane indicated by the section line 12—12 of FIGURE 7 and showing the disposition of the twin suction ducts of the suction dredge portion of the apparatus;

FIGURE 13 is a vertical transverse sectional view taken upon an enlarged scale substantially upon a plane indicated by the section line 13—13 of FIGURE 7 and showing further details of the suction dredge portion of the apparatus;

FIGURE 14 is a detail view taken upon an enlarged scale and substantially upon the plane indicated by the section line 14—14 of FIGURE 7 and showing a portion of the jet unit of the suction dredge assembly into which the twin suction ducts of the apparatus discharge;

FIGURE 15 is a detail view showing in vertical elevation a resilient coupling by which the cable and pulley assembly is connected to the ladder assembly;

FIGURE 16 is a detail view in vertical transverse section being taken substantially upon the plane indicated by the section line 16—16 of FIGURE 15; and FIGURE 17 is a perspective view of the suction duct assembly, the jet unit and the discharge ducts of the suction dredge portion of the apparatus.

Referring first to FIGURE 1 it will be observed that a barge indicated generally by the numeral 10 is provided for the purpose of facilitating the positioning and laying of a pipe line or conduit 12 in a submarine trench 14 below the water level 16. This barge may be of any suitable character including a vessel specifically adapted and designed for this particular purpose. The pipe line or conduit 12 to be laid is of any conventional type it being understood that a long and continuous length of pipe is to be deposited in a submarine trench 14 and the pipe will be subsequently covered by either natural or artificial means as desired.

Indicated by the numeral 18 is a cable or line having an anchor 20 by means of which barge may be anchored at a suitable position above the pipe to be deposited in the submarine trench, it being understood that the usual winch mechanism indicated generally by the numeral 22 is provided upon the barge to handle the cable 18 and anchor 20 and thus propel the barge over the pipe 12. There is also shown an apparatus indicated generally by the numeral 30 which forms the subject matter of this invention and which is adapted specifically for cooperation with the pipe line 12 in a novel manner and to effect the excavating of the submarine trench 14. There are provided suitable hydraulic fluid delivery conduits 32 and 34 for supplying hydraulic fluid to the dredging apparatus 30, it being understood that suitable pumps and other equipment are provided in the housing indicated by the numeral 36 on the barge for effecting flow of the pressure fluid to the dredging unit. Inasmuch as the means provided to effect the supply of a fluid under pressure from the unit 36 to the dredge 30 through the conduits 32 and 34 may be of any known conventional design, and the principles of the invention are not limited to any particular design for this purpose a further description and explanation of the same is deemed to be unnecessary.

Referring next to FIGURE 2 it will be observed that the dredging apparatus 30 has as its major components a buoyancy tank 36 which is adapted to support the weight of the dredging unit and if desired a portion of the weight of the pipe or conduit 12 during the trenching operation of the apparatus together with upper and lower carriage assemblies 38 and 40 supported by the buoyancy tank 36 and which embrace the pipe 12, engaging the top and bottom surfaces of the latter, for travel of the device along the pipe, together with a ladder assembly 42 which carries and mounts thereon a suction dredge unit for pivotal tilting adjustment relative to the carriage assemblies 38 and 40 about a transverse horizontal axis whereby to vary the depth of excavation of submarine trenches in which the pipe line is to be laid.

The suction dredge assembly which is carried by the ladder assembly 42 is indicated generally by the numeral 44 a portion of this assembly and especially its suction and discharge duct structure being shown in FIGURE 17.

The buoyancy tank 36 is provided with a lifting support 46 by means of which the entire apparatus can be lifted from the water, or raised or lowered from the barge as required during its operation and especially during its attachment to or its removal from a pipe line 12. The tank further includes a plurality of bulkheads 48 therein providing therebetween buoyancy chambers to which air under pressure may be supplied by a suitable piping system, a portion of which is shown at 50, while manually operated valved vents 52 depend from the bottom of the buoyancy tank 36 and communicate with the buoyancy chambers therein for the purpose of controlling the inlet of water ballast thereto to thereby regulate the trim and buoyancy of the tank. It is to be understood that the supply of air to the various buoyancy chambers in the tank will be regulated from the barge at the surface by conventional means, not shown.

Considering next FIGURE 2 in conjunction with FIGURES 3 and 4 it will be observed that the buoyancy tank 36 is pivotally mounted to the carriage and in particular to the upper carriage assembly 38 thereof in a manner to prevent tilting or pivoting of the buoyancy tank about an axis which extends longitudinally of the apparatus. For this purpose there is fixedly secured to the tank 36 at each end thereof, and to one side of the tank a plurality of mounting brackets 54 which are secured as by pivot pins 56 to the upper carriage assembly 38 at one side of the ladder. These pivot pins and mounting brackets constitute a pivotal mounting for the buoyancy tank upon the upper carriage assembly. Upon the other side of the buoyancy tank from the mounting brackets 54 there is secured a cable 58 which is releasable or adjustable in a manner and for a purpose to be specifically set forth hereinafter to thereby secure or anchor the buoyancy tank to the carriage in an adjustable and releasable manner.

It will be understood at this point that the buoyancy tank may be employed in some instances to support and float the entire weight of the apparatus or any desired portion thereof; or even a portion of the weight of the pipe 12 to be handled. In addition, the buoyancy effect of the buoyancy tank will be adjusted by control of the water ballast in the buoyancy compartments therein in order to produce a net floating or sinking effect of the buoyancy tank as set forth hereinafter.

Referring next in particular to FIGURES 2, 5 and 8 it will be seen that the upper carriage assembly 38 consists of a suitable lattice-like supporting framework including the cross members 60, as shown in FIGURE 8, and this framework has on opposite sides of the longitudinal center line thereof two sets of wells, bores or recesses 62 therethrough in which are journalled axles 64 carrying support and driving wheels 66. As will be now understood from a consideratoin of FIGURES 3 and 4, each of the wheels 66 rotates in a plane which is disposed radially of the longitudinal axis of the pipe line 12 and the wheels contact the upper surface of the pipe line for travel therealong. Any suitable means may be provided for imparting rotation to the wheels in order to effect such travel of the carriage upon the pipe line. As shown in FIGURE 8, the axle 64 may be provided with sprocket gears 68 thereon about which are entrained sprocket chains 70, see FIGURE 5, through which rotation may be imparted to the plurality of supporting and driving wheels 66. Preferably rotation is imparted to the sprocket chains in order to effect rotation of the supporting and driving wheels by means of a driving sprocket gear 72, see FIGURE 2, which in turn is powered by any suitable means such as a fluid pressure operated motor 74 which may be supplied by pressure fluid from the surface by a conduit and control means, not shown. Thus when the motor 74 is energized, the sprocket chain will cause rotation of the wheels 66 and thus in turn will effect movement or travel of the pipe line upon which the carriage is mounted and supported by these wheels.

It will be understood that the supporting and driving wheels 66 may be of any desired character, and for example may be rubber tired if desired in order to afford better traction upon the exterior surface of the pipe line 12. The upper carriage assembly 38 is V-shaped in cross-section, as will be apparent from FIGURES 3 and 4, so as to overhang the sides of the pipe line 12 and insure a more stable engagement of the pipe line in the carriage.

As previously mentioned, the carriage is secured to the buoyancy tank 36 through the previously mentioned mounting brackets 54 and the cable 58.

It will also be understood by reference to FIGURES 2 and 5 that suitable idler sprockets as at 76 are journalled upon and carried by the upper carriage assembly 38 in order to guide the sprocket chain 70 and insure perfect contact of the latter with the driven sprocket gears 68 on the axles 64 of the wheels 66.

Referring next particularly to FIGURES 2 and 6 it will be seen that the lower carriage assembly 40 likewise includes a lattice-like framework which is spaced beneath the upper carriage assembly 38, is connected thereto and which cooperates with the upper carriage assembly for embracing the pipe line 12 therebetween. Journalled on the lower carriage assembly are a plurality of retaining rollers 78 which are journalled upon suitable axles as at 80 carried by the lower frame assembly and which likewise are arranged in two laterally spaced longitudinally disposed rows for embracing and riding upon the undersurface of the pipe line 12 in opposition to the wheels 66. The function of the retaining rollers 78 is merely to insure the firm engagement for support and traction of the wheel 66 upon the top surface of the tank and to enable the carriage consisting of the upper and lower carriage assemblies to firmly grip and retain the pipe line 12 therebetween in order to effect support of the dredging unit upon the pipe line and facilitate controlled travel of the unit along the pipe line.

Any suitable means are provided for connecting the lower carriage assembly 40 with the upper carriage assembly 38 in a manner to embrace and retain the pipe line therebetween, such a means conveniently consisting of the connecting flanges or plates 82, see also FIGURE 2, which may be rigidly secured to one of the carriage assemblies as for example the upper carriage assembly and may be releasably secured as by a pivot pin 84 to the lower carriage assembly.

As so far described it will now be understood that in operation of the device the pivot or retaining pins 84 may be released and the upper and lower carriage assembly may then be disconnected; or one of the sets of pins may be released at one side of the carriage allowing the upper and lower carriage sections to swing about the other set of pins in order to permit lateral movement of the carriage assemblies upon or from the pipe line. During this operation, when the apparatus is submerged in the water, the buoyancy tank 36 previously mentioned may be employed to facilitate supporting, raising or lowering the carriage assembly as necessary to effect this operation.

Referring further to FIGURE 2 it will be observed that suitable reinforcing cables as at 86 are connected to the buoyancy tank 36 and to the lower carriage assembly to rigidify and distribute the stresses between these elements.

Referring now to FIGURES 2 and 7 in particular it will be observed that the ladder assembly 42 likewise consists of a lattice-like framework which serves to support thereon and therein the suction dredge assembly 44 previously mentioned. Adjacent one end, the ladder assembly 42 is pivotally connected at 90 to a bracket means 92 secured to and depending from the lower carriage assembly 40. The pivot pin 90 constitutes an axis disposed transversely of the lower carriage assembly and the ladder assembly and is adjacent one end of the ladder whereby vertical tilting movement of the ladder assembly relative to the carriage and the pipe line is rendered possible. Adjustable tilting is imparted to the ladder assembly and to the suction dredge assembly carried thereby in order to vary the operation of the ladder and thus control the depth of a submarine trench which is to be excavated by the apparatus during its operation. The tilting control means consists of a pulley and cable assembly regarding which attention is now directed more specifically to a consideration of FIGURES 2, 6, 9, 10 and 11. The cable and pulley assembly designated generally by the numeral 94 illustrates one form of satisfactory mechanism by which controlled tilting may be imparted to the ladder assembly and the suction dredge assembly. Obviously, various other actuating means can be employed for the same general purpose.

The assembly 94 consists of two cables disposed in side-by-side relation each of which is indicated generally by the numeral 96. One end of each cable as at 98 is secured to the ladder assembly 42, preferably by a resilient coupling as shown in FIGURES 15 and 16 in a manner to be subsequently set forth in detail. The other end of each cable is then fastened as at 100 to a convenient portion of the carriage such as to the lower carriage assembly 40 and conveniently is attached to the side of a hydraulic ram 102 which is pivotally or if desired fixedly mounted upon the lower carriage assembly. The intermediate portion of each cable is then entrained about a series of pulleys 104 which are mounted for rotation by a stationary axis and are carried by the lower carriage assembly 40, thence about a second set of pulleys 106 which are mounted upon the piston rod 108 of the ram, and are finally entrained over guide pulleys 110 suitably mounted in a well or recess 112 in the lower carriage assembly in order to permit passage of the cable from the lower carriage assembly to the ladder assembly and the previously mentioned attachment at 98.

It will now be understood that by the proper manipulation of suitable controls at the surface, not shown, the ram 102 may be operated to thus selectively tension or release the cables 96 of the cable and pulley assembly 94, thereby raising or lowering the ladder assembly 42 about its transverse pivot 90.

Referring next especially to FIGURES 2, 7 and 17, it will be observed that the suction dredge assembly 44 includes twin suction ducts 114 which extend longitudinally of the ladder assembly and which have their forward ends extending forwardly of the ladder assembly, while their rear ends merge into a Y-coupling 116 which forms the inlet end of a venturi jet unit 118. From the jet unit 118 a discharge conduit 120 in turn discharges into a divided upwardly or rearwardly directed discharge ducts 122 from whence the material flowing therethrough is discharged rearwardly of the dredge onto the bottom and on both sides of the pipe 12 beneath the water.

It will be here understood that the jet unit 118 is of the well-known venturi type to which fluid is supplied by a supply duct 124 under suitable pressure from the pumping apparatus housed in the unit 36 on the barge and by the conduits 32, 34. Since the construction of the jet unit 118 may be of any conventional and known design, a detailed description of the same is deemed to be unnecessary, it being merely noted that the flow of fluid introduced through the conduit 124, promotes a flow through the discharge pipe 120 and the discharge ducts 122 which in turn imparts a suction to the suction ducts 114.

The suction ducts 114 have their adits or inlet ends terminating adjacent the front end of the ladder assembly 42. Suitably journalled in the ladder assembly 42 are a pair of cutter drive shafts 130 which project beyond the front ends of the ladder assembly and forwardly of the inlet ends of the suction ducts 114, being provided with cutter heads 132 thereon of any suitable type. The journalling of these cutter shafts in the ladder assembly 42 is indicated in FIGURES 12–14, and in itself is not essential to the invention claimed herein.

At their rearward ends, the cutter shafts 130 are suitably connected to and are driven by a fluid motor 134 likewise mounted upon the ladder assembly 42 at the rearward end of the same, operating fluid being supplied to its fluid motor from the surface as through the conduits 136. The arrangement of the two fluid motors is also shown in the rear end view of FIGURE 4.

The operation of the hydraulic dredge is as follows. Water under pressure is pumped through both hoses 32 and 34 into conduit 124 and then is discharged into nozzles in the forward end of the venturi chamber 118 towards the rear thereof and towards the discharge duct 122. The flow of water from these nozzles into the venturi produces a velocity of flow in the venturi shaped chamber which in turn decreases pressure at the forward end thereof and hence in the suction ducts 114 and 116 thereof. Material loosened by the cutter heads 132 is thus drawn with water into the ducts 114 and 116, into the venturi member 118 and is discharged therefrom, together with the water received through the bosses 32, 34 into the discharge ducts 122 to each side of the pipe 12.

The conduits 126 may be provided with hand operated valved connections with the ducts 114 to back wash the latter from the pressure water from 32, 34 and 124 in the event that there is a stoppage in the ducts 114.

As previously mentioned, the attachment of the cables of the suction dredge tilt adjusting mechanism at 98 to the ladder assembly is by a resilient coupling. Referring now especially to FIGURES 15 and 16 it will be observed that these cables are directly connected to a U-bolt 140, the legs of which are secured to a cross-bar 142 with resilient springs 144 and rubber cushions 146 being operatively interposed therebetween. The upper buffer engages a bracket 148 which is suitably mounted upon the structure of the ladder assembly. Cooperating with the cross bar 142 is an electric switch 150 having an actuating arm 152 engaging the cross plate and disposed therebetween. The arrangement is such that if the suction dredge and the ladder assembly are lowered too rapidly so that the tension imparted thereby upon the cable assembly decreases below a predetermined minimum value, the resilient connection will cause the cross-bar 142 to move downwardly and activate the switch 150. This in turn will operate a signal through a suitable electrical circuit, not shown, to warn the operator at the surface of this condition.

It will be understood the suitable controls and indicators, not shown are provided to regulate or indicate the conditions of operation of the apparatus in order to enable its functions to be precisely controlled and regulated from the surface.

The foregoing is considered as illustrative only of the principles of the invention. Further, since numerous

What is claimed as new is as follows:

1. A submarine pipe trenching machine comprising a carriage, means including a frame for embracing and for movably mounting and supporting said carriage solely upon a pipe to be deposited in a submarine trench, a suction dredge assembly mounted upon said carriage and dependingly disposed therebeneath for excavating a submarine trench in which said pipe is to be deposited, means mounted on said carriage and engaging said pipe for effecting movement of said carriage along said pipe, means for operating said suction dredge assembly, a pivotal mounting connecting said suction dredge assembly to said carriage for tilting adjacent the rear end of the former about an axis lying transversely thereof and therebeneath, means for adjustably tilting said suction dredge assembly about said axis, said tilting means including a cable and pulley assembly connected to said carriage and to said suction dredge assembly adjacent the forward end of the latter.

2. The combination of claim 1 wherein said suction dredge assembly comprises a lattice-like frame disposed beneath said carriage and pivoted to the latter for tilting about a transverse axis disposed beneath the carriage and at the rear end of the carriage and dredge assembly, a cable and pulley means connected to the carriage and dredge assembly for effecting tilting of the latter, a resilient connection between the cable and pulley means and said dredge assembly and resiliently securing the former to the latter.

3. The combination of claim 2 including a signaling means connected to and operated by said resilient connection for indicating tilting of said dredge assembly in excess of a predetermined rate.

4. A submarine pipe trenching machine comprising a carriage, means including a frame for embracing and for movably mounting and supporting said carriage solely upon a pipe to be deposited in a submarine trench, a suction dredge assembly mounted upon said carriage and dependingly disposed therebeneath for excavating a submarine trench in which said pipe is to be deposited, means mounted on said carriage and engaging said pipe for effecting movement of said carriage along said pipe, means for operating said suction dredge assembly, a pivotal mounting connecting said suction dredge assembly to said carriage for tilting adjacent the rear end of the former about an axis lying transversely thereof, means for adjustably tilting said suction dredge assembly about said axis, said tilting means including a cable and pulley assembly connected to said carriage and to said suction dredge assembly adjacent the front end of the latter, said cable and pulley assembly including a hydraulic ram secured to and carried by said carriage, said ram rotatably supporting a set of pulleys over which the cable of said cable and pulley assembly is entrained whereby operation of said ram will through its associated set of pulleys effect tensioning and releasing of said cable and pulley assembly and thereby tilting of said suction dredge assembly.

5. A submarine pipe trenching machine comprising a carriage, means including a frame for embracing and for movably mounting and supporting said carriage solely upon a pipe to be deposited in a submarine trench, a suction dredge assembly mounted upon said carriage and dependingly disposed therebeneath for excavating a submarine trench in which said pipe is to be deposited, means mounted on said carriage and engaging said pipe for effecting movement of said carriage along said pipe, means for operating said suction dredge assembly, said carriage comprising upper and lower carriage assemblies of lattice like construction, means releasably and pivotally connecting said assemblies along an axis which is parallel to that of a pipe embracing by said assemblies, driving and supporting wheel journalled in said upper assembly and retaining wheels journalled in said lower assembly for embracing opposite sides of a pipe therebetween.

References Cited in the file of this patent

UNITED STATES PATENTS

| | | |
|---|---|---|
| Re. 23,963 | Collins | Mar. 15, 1955 |
| 1,619,850 | Casey | Mar. 8, 1927 |
| 1,703,777 | Pernot | Feb. 26, 1929 |
| 2,361,404 | Kalix | Oct. 31, 1944 |
| 2,461,311 | Cushing et al. | Feb. 8, 1949 |
| 2,693,085 | Salnikov | Nov. 2, 1954 |
| 2,755,632 | Hauber et al. | July 24, 1956 |
| 2,859,717 | Cummings | Nov. 11, 1958 |
| 3,004,392 | Symmank | Oct. 17, 1961 |